(12) United States Patent
Raynor et al.

(10) Patent No.: US 8,049,794 B2
(45) Date of Patent: Nov. 1, 2011

(54) METHOD AND APPARATUS FOR PROCESSING IMAGE DATA

(75) Inventors: Jeff Raynor, Edinburgh (GB); Ed Duncan, East Lothian (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 1197 days.

(21) Appl. No.: 11/279,597

(22) Filed: Apr. 13, 2006

(65) Prior Publication Data

US 2006/0248030 A1 Nov. 2, 2006

(30) Foreign Application Priority Data

Apr. 30, 2005 (EP) .................................... 05252726

(51) Int. Cl.
*H04N 5/262* (2006.01)
*G09G 5/00* (2006.01)
(52) U.S. Cl. ........................ 348/239; 345/629
(58) Field of Classification Search .................... 348/239
See application file for complete search history.

(56) References Cited

U.S. PATENT DOCUMENTS

| | | | | |
|---|---|---|---|---|
| 5,392,069 A * | 2/1995 | Koyama et al. | ............... | 348/239 |
| 5,453,780 A | 9/1995 | Chen et al. | ...................... | 348/15 |
| 5,463,728 A | 10/1995 | Blahut et al. | ................. | 395/158 |
| 5,502,486 A * | 3/1996 | Ueda et al. | ..................... | 348/239 |
| 5,633,678 A * | 5/1997 | Parulski et al. | ............. | 348/231.5 |
| 5,973,751 A * | 10/1999 | Ishida et al. | .................. | 348/590 |
| 6,005,637 A * | 12/1999 | Suzuki | .......................... | 348/584 |
| 6,211,913 B1* | 4/2001 | Hansen et al. | ................. | 348/239 |
| 6,285,661 B1 | 9/2001 | Zhu et al. | ....................... | 370/260 |
| 6,327,004 B1* | 12/2001 | Miyabayashi et al. | ........ | 348/590 |
| 6,483,540 B1* | 11/2002 | Akasawa et al. | .............. | 348/239 |
| 6,532,039 B2* | 3/2003 | Anderson | ................... | 348/231.3 |
| 6,546,187 B1* | 4/2003 | Miyazaki et al. | ............... | 386/52 |
| 6,556,243 B1* | 4/2003 | Dotsubo et al. | ............. | 348/231.2 |
| 6,621,524 B1* | 9/2003 | Iijima et al. | .................... | 348/584 |
| 7,017,184 B2* | 3/2006 | Kitazawa et al. | ............... | 726/20 |
| 7,230,653 B1* | 6/2007 | Overton et al. | ............... | 348/584 |
| 7,286,168 B2* | 10/2007 | Yamasaki | ..................... | 348/239 |
| 7,551,211 B2* | 6/2009 | Taguchi et al. | ................. | 348/239 |
| 7,580,066 B2* | 8/2009 | Shirakawa | ..................... | 348/239 |
| 2002/0012522 A1* | 1/2002 | Kawakami et al. | ............. | 386/52 |
| 2002/0176012 A1* | 11/2002 | Wasada | ......................... | 348/239 |
| 2003/0071905 A1* | 4/2003 | Yamasaki | ..................... | 348/239 |
| 2003/0193512 A1* | 10/2003 | Komagata | ..................... | 345/629 |
| 2004/0183949 A1* | 9/2004 | Lundberg et al. | ............. | 348/587 |
| 2005/0093983 A1* | 5/2005 | Silverbrook | ............. | 348/207.99 |
| 2005/0152002 A1* | 7/2005 | Shirakawa et al. | .......... | 358/1.18 |
| 2005/0195294 A1* | 9/2005 | Kim et al. | ...................... | 348/239 |
| 2005/0231613 A1* | 10/2005 | Skurdal et al. | ................. | 348/239 |
| 2007/0035640 A1* | 2/2007 | Misawa | ......................... | 348/239 |

* cited by examiner

*Primary Examiner* — Justin P Misleh
(74) *Attorney, Agent, or Firm* — Lisa K. Jorgenson; Allen, Dyer, Doppelt, Milbrath & Gilchrist, P.A.

(57) ABSTRACT

The method of processing a first digital image by combining the first digital image with a second digital image includes the first digital image being received from a pixel array, and when receiving the first digital image it is converted into a first continuous sequential data stream. The second digital image may be provided in the form of a second continuous sequential data stream, and the first and second digital images may be combined by continuously combining the data in the first and second data stream.

16 Claims, 9 Drawing Sheets

METHOD AND APPARATUS FOR PROCESSING IMAGE DATA

FIELD OF THE INVENTION

The present invention relates to image processing, and, more particularly, to combining a plurality of images.

BACKGROUND OF THE INVENTION

Image processing may include processing a first digital image by combining the first digital image with a second digital image. Such a combination of the data of the first and second digital images may be used with the overlaying of one of the images to the other image. One of those images then functions as background, a border or as a mask, and the other image is combined and/or merged with the overlay, background, mask etc. These schemes are preferably used with respect to overlaying a logo or caption on video data.

The video data comprises data representing a succession of digital images (frames), wherein those digital images, i.e. individual frames, are referred to hereinafter as the first digital image. The logo, caption, background, mask etc., referred to as the "overlay", is represented by digital image data also. The digital image data of the overlay is hereinafter referred to as the second digital image.

According to the state of the art, applying logo and/or caption data to digital image data is accomplished via commercially available overlay generators which are normally standalone devices and which must be purchased at considerable costs. Additionally, there are software approaches available, which enable the addition of logo and/or caption data to digital image data, but those approaches add a considerable computing overhead and as an additional disadvantage, may be disabled.

SUMMARY OF THE INVENTION

An object of the present invention is to provide a fully integrated approach, which may not be deactivated without interfering with the integrity of the apparatus performing the method and which is both fast and inexpensive.

This and other objects may be achieved by a method of processing a first digital image by combining the first digital image (e.g. video data) with a second digital image (overlay), wherein the first digital image is received from a pixel array and wherein, when receiving the first digital image from the pixel array, the first digital image is converted into a first sequential data stream. The sequential data stream is preferably a continuous sequential data stream.

The pixel array is one example of a data source for the image data of the first digital image. Other types of data sources may be envisaged also. For example, the image data may be simply transmitted from another (remote) device capturing optical data and may be provided to the method or the apparatus performing the method as an input in the form of a pixel array. The term "pixel array" refers to the data structure, since image data is usually provided in the form of an array, where the continuous data stream represents a succession of lines and where each line comprises a succession of pixels and wherein finally, the pixel reflects color and/or brightness information about a respective position in the captioned image.

The second digital image may be provided in the form of a second sequential data stream, and the first and second digital images may be combined by continuously combining the data comprised in the first and the second data stream. If the first sequential data stream is provided in the form of a first continuous sequential data stream, then preferably the second sequential data stream is a second continuous sequential data stream also.

Preferably, the second image, which is in most cases "smaller" than the first image, both in regards to dimension and/or amount of data, is converted into a second sequential data stream representing the same amount of data as the first sequential data stream originating from the first image. With these conditions met, combining the first and second sequential data stream on a continuous basis is significantly facilitated, since combining the relevant data is simply performed on an ongoing basis and no timing related information, such as trigger points indicating a start point and/or an end point for combining the image data, needs to be processed.

To include a caption frame, for example, around a first image, which would require the converted second image to be larger in dimension than the first image, caption frame portions of the first image would be included into the first sequential data stream originating from the first digital image, i.e. the caption frame portions are included into the first sequential data stream when reading out the image sensor. Thus, it should be understood that the first and second images can be identical in dimension or can differ in dimension. According to this aspect of the invention, a first and a second sequential data stream originating from the first and second image respectively, and representing the same amount of data, will be provided, which significantly facilitates combining the image data.

Beneficially, the conversion of the second image into a second sequential data stream representing and/or comprising the same amount of data as the first sequential data stream originating from the first image is facilitated due to the second image being stored in a compressed format, more particularly in RLL format (run length limited).

Furthermore, preferably the second sequential data stream originating from the second image is associated by another data stream comprising data representing and/or indicating a relevant combination mode. By employing the additional data stream it is possible to change the combination mode as desired. For example, an overlay, such as a logo and/or a caption, may comprise digital data, which would be required to simply overlay the data in the first image, such as pixels representing characters in a caption line, and other data, where the image data of the first image prevails, such as pixels in between those pixels representing characters in a caption line.

The combination mode can reflect any possible logical or arithmetical combination. The logical combinations can be combinations such as logical AND, logical OR, logical XOR etc. However, more complex logical and/or arithmetical combinations may be envisaged such as combinations which take into account not only the current pixel in the relevant first and second sequential data stream, but the "surrounding" pixels also, for example, the preceding and the succeeding pixel.

BRIEF DESCRIPTION OF THE DRAWINGS

Other features and advantages of the present invention will appear from the following description of a preferred embodiment of the invention, given as a non-limiting example illustrated in the drawings. All the elements which are not required for the immediate understanding of the invention are omitted. In the drawing, the same elements are provided with the same reference numerals in the various figures in which.

DETAILED DESCRIPTION OF THE PREFERRED EMBODIMENTS

In the following description, for purposes of explanation and not limitation, specific details are set forth such as particular embodiments, data flows, signaling implementations interfaces, techniques etc., to provide a thorough understanding of the present invention. However, it will be apparent to one skilled in the art that the present invention may be practiced in other embodiments that depart from these specific details.

For example, while the present invention is described in the context of an apparatus comprising a pixel array, those skilled in the art will appreciate that the present invention can be implemented in an apparatus which receives the image data from another (remote) apparatus which performs the image capture process and transmits the captured image data in the form of a pixel array to the apparatus as depicted.

Under these conditions, the term "pixel array" refers to the data received from the remote device. However, in an embodiment as illustrated, the term pixel array refers to a physical, i.e. tangible, device, which is capable of obtaining the video data, such as a CMOS or CCD sensor or alike. In other instances, detailed descriptions of well known methods, interfaces, devices and signaling techniques are omitted so as not to obscure the description of the present invention with unnecessary detail.

Figure 1:
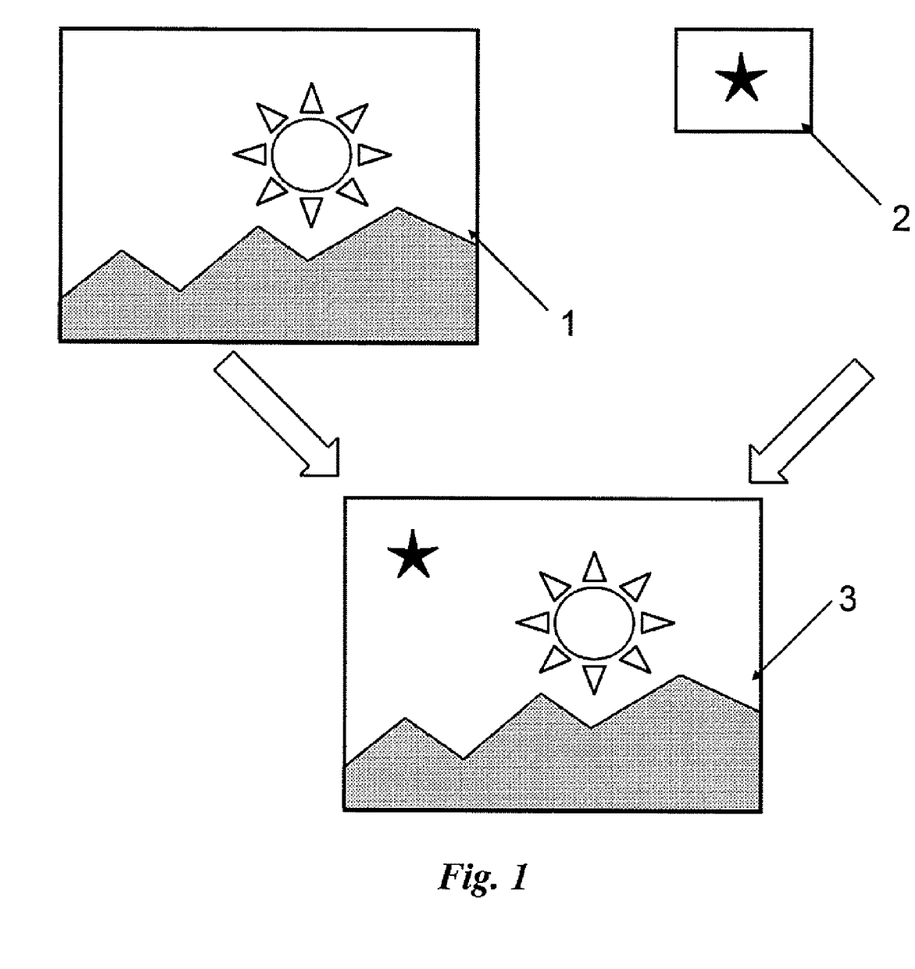
FIG. 1 is a simplified diagram illustrating the conventional combination of a first and second digital image.

FIG. 1 shows in simplified manner the combination of a first digital image 1, which is normally video data, such as a frame from a digital video film or a digital picture, and a second digital image 2, which is normally a logo or the like. Both digital images are combined and the second digital image 2, e.g. the logo, appears to be inserted into (overlaid onto) the resulting image 3.

Figure 2:
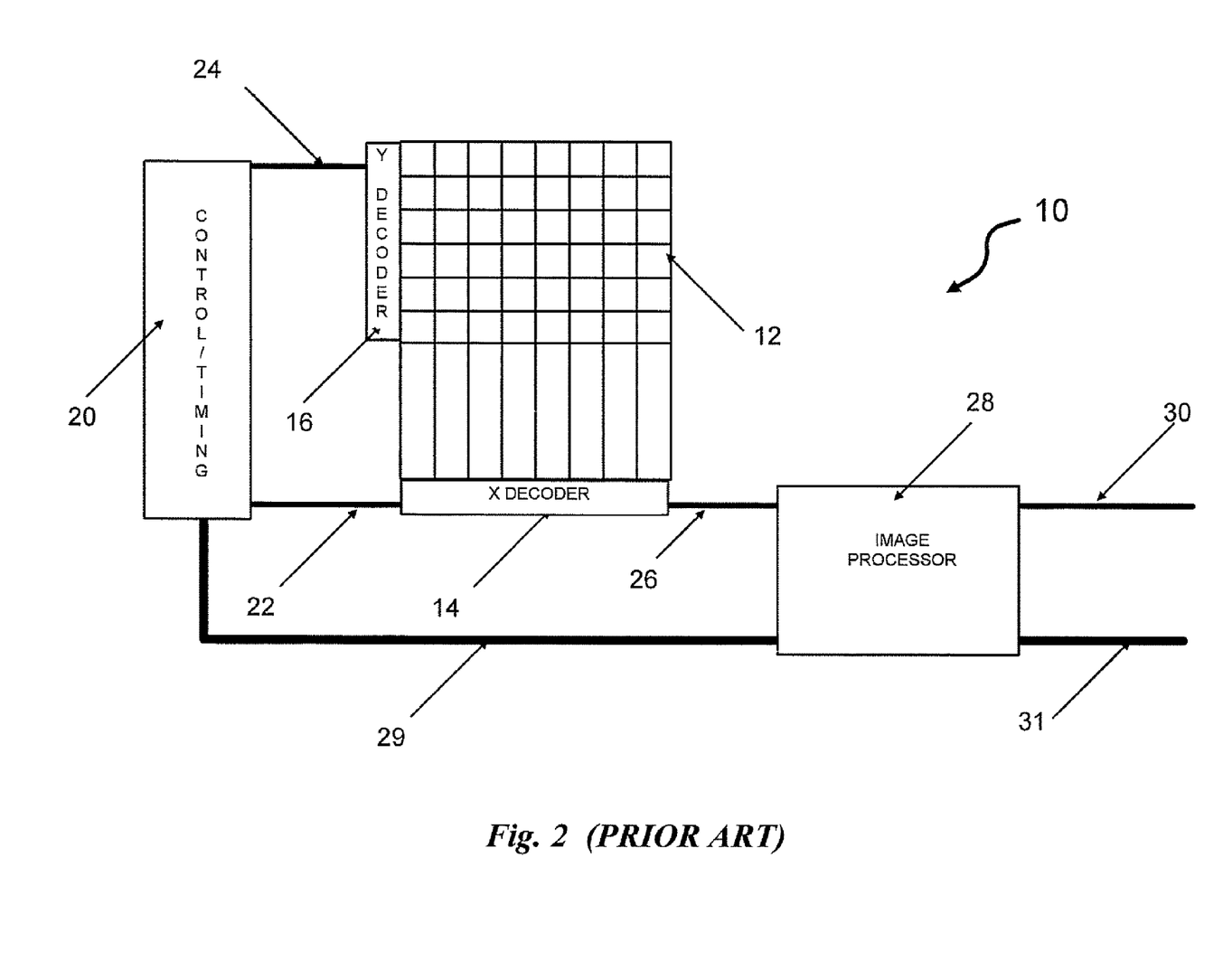
FIG. 2 is a schematic diagram illustrating a prior art apparatus for obtaining image data.

FIG. 2 shows a conventional apparatus 10 (imager) for processing a digital image (first digital image). The imager 10 comprises a pixel array 12 and an X decoder 14 and a Y decoder 16 associated with the pixel array 12. The X and Y decoder 14, 16 are used for reading out the image data in the pixel array 12. Reading out of the image data from the pixel array 12 is performed under the control of a control/timing generator 20 which issues an X address at an X address line 22 to the X decoder 14 and a Y address at a Y address line 24 to the Y decoder 16 to (successively) select the relevant pixel from the pixel array 12.

At a raw image output line 26 the succession of pixels in the pixel array 12 are transmitted as a raw image output in the form of a first sequential data stream to an image processor 28. When reading out the relevant pixels from the pixel array 12 usually read amplifiers and/or analog digital converters are used, as is well known in the art and therefore not specifically depicted. The control/timing generator 20 and the image processor 28 are connected via a timing line 29 over which the control/timing generator 20 provides the relevant timing information to the image processor 28. The output of the image processor 28 is the processed image (first image 1), which can be obtained at a processed image output line 30. The processed image is an image as depicted in FIG. 1 as the first image 1.

The depiction of the imager 10 in FIG. 2 is the block diagram of a standard imager. The control/timing generator 20 produces the necessary timing signals for correct operation of the optical sensor, which includes the pixel array 12. This includes the signals for resetting and reading out the pixels (the time difference between these two signals provides electronic shuttering) and control of exposure. The control/timing generator 20 further produces timing signals for reading out the pixel array 12. It may also provide automatic exposure control (AEC). Finally, the control/timing generator 20 produces timing signals for used by external circuitry, e.g. horizontal and vertical synchronizing pulses.

The X and the Y decoders 14, 16 are used for accessing the desired column and row in the pixel array 12. An advanced system would also incorporate an image processor 28, which could provide such features as defect correction (hide or mask defective pixels), color processing, automatic white balance, gamma correction, sharpness, output processing, e.g. JPEG (Joint Photographic Coding Expert Group) image compression etc.

If the addition of a logo or caption, etc. (overlay) is required, state of the art approaches would use an additional apparatus, which is hereinafter referred to as an overlay generator. The overlay is an image as depicted in FIG. 1 as the second image 2.

Figure 3:
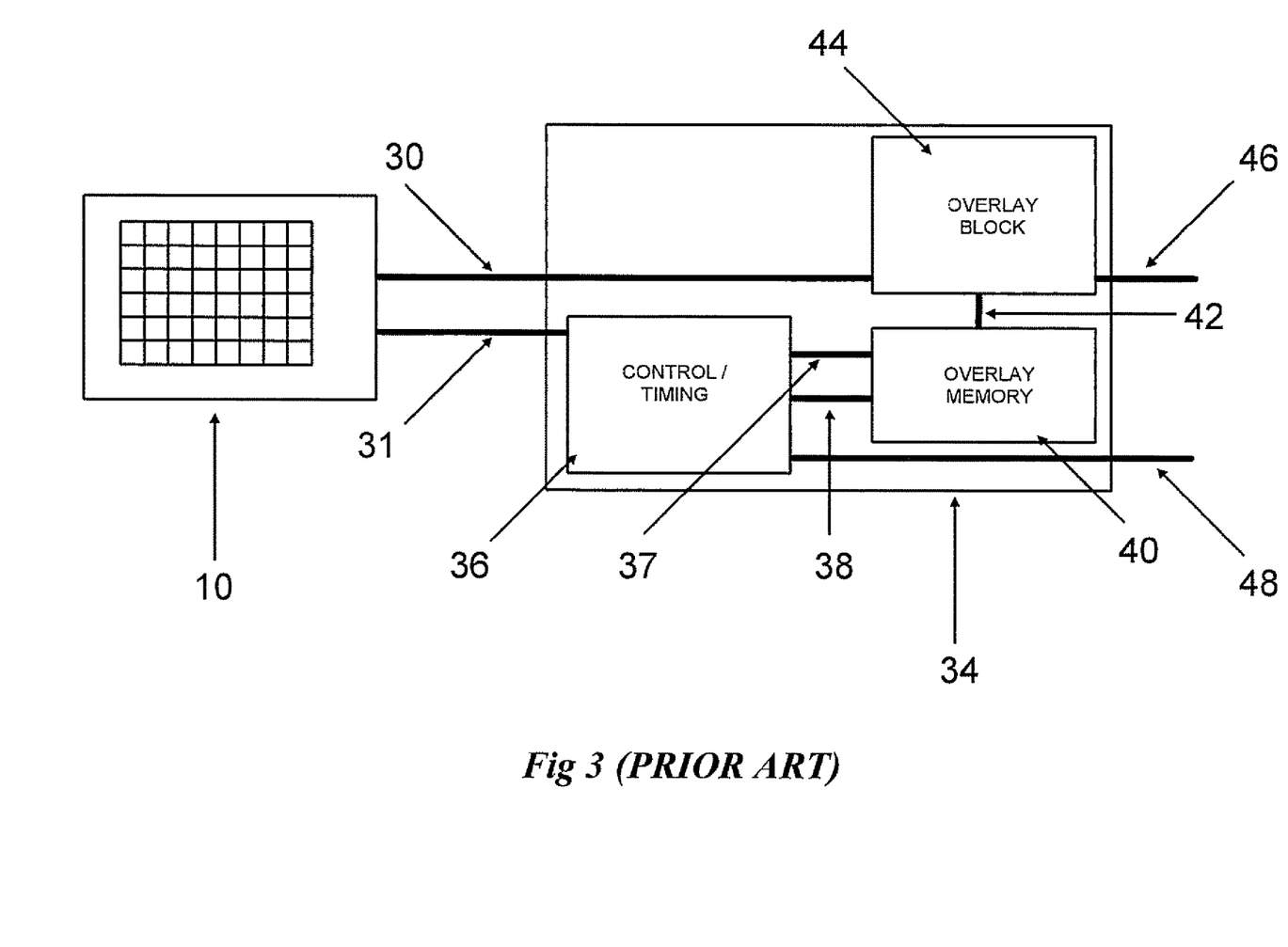
FIG. 3 is a schematic diagram illustrating a prior art apparatus for adding caption and/or logo data to image data.

The combination of the imager 10 and an overlay generator 34 are depicted in FIG. 3. The imager 10 provides, as output, an image output at the processed image output line 30 and a timing output at the timing output line 31. The image output and the timing output are fed as input to the overlay generator 34. The overlay generator 34 processes the timing output via an internal control/timing generator 36 which is in addition to the control/timing generator 20 in the imager 10, since the pixel address is not typically output from the imager 10 due to the cost of the number of pins required. Therefore, the pixel address needs to be regenerated by the internal control/timing generator 36 in the overlay generator 34, because of the timing output received from the imager 10.

The internal control/timing generator 36 generates the X and Y address of the pixels in the data stream which is being transmitted on the processed image output line 30 of sensor 10. The regenerated X and Y addresses are fed via respective internal X and Y address lines 37, 38 to an overlay storage means/unit 40 which at least comprises a memory for storing the caption and/or logo data (overlay data). The X and Y address is used to access the overlay data and the overlay data is transmitted from the overlay storage means 40 via an overlay data line 42 to an overlay block 44 provided for combining the overlay data (second image) with the processed image output (first image). The output of the overlay generator 34 is an image output with overlay, which can be obtained at an image output with overlay line 46 and a modified timing output which can be obtained at a modified timing output line 48.

As will be apparent to one skilled in the art there are various ways for combining the image data (image output) and the overlay data (caption and/or logo data) to produce an image output with overlay. It is to be understood that with the separate overlay generator 34, it is necessary to have another control/timing generator in the overlay generator 34, namely the internal control/timing generator 36, which replicates a large number of the functions which are provided in the imager 10, namely by the control/timing generator 20 in the imager 10. It is also usually necessary to adjust the timing of the signal to compensate for the delay produced by the adding of the overlay.

An object of the invention regarding costs and efficiency is therefore mainly achieved by integrating the overlay generator 34 into the imager 10. This saves duplication of the control logic, which accounts for reduced costs and simplifies the timing generation, which in turn accounts for the increased efficiency, since the overlay is added during the existing image processing procedure.

Figure 4:
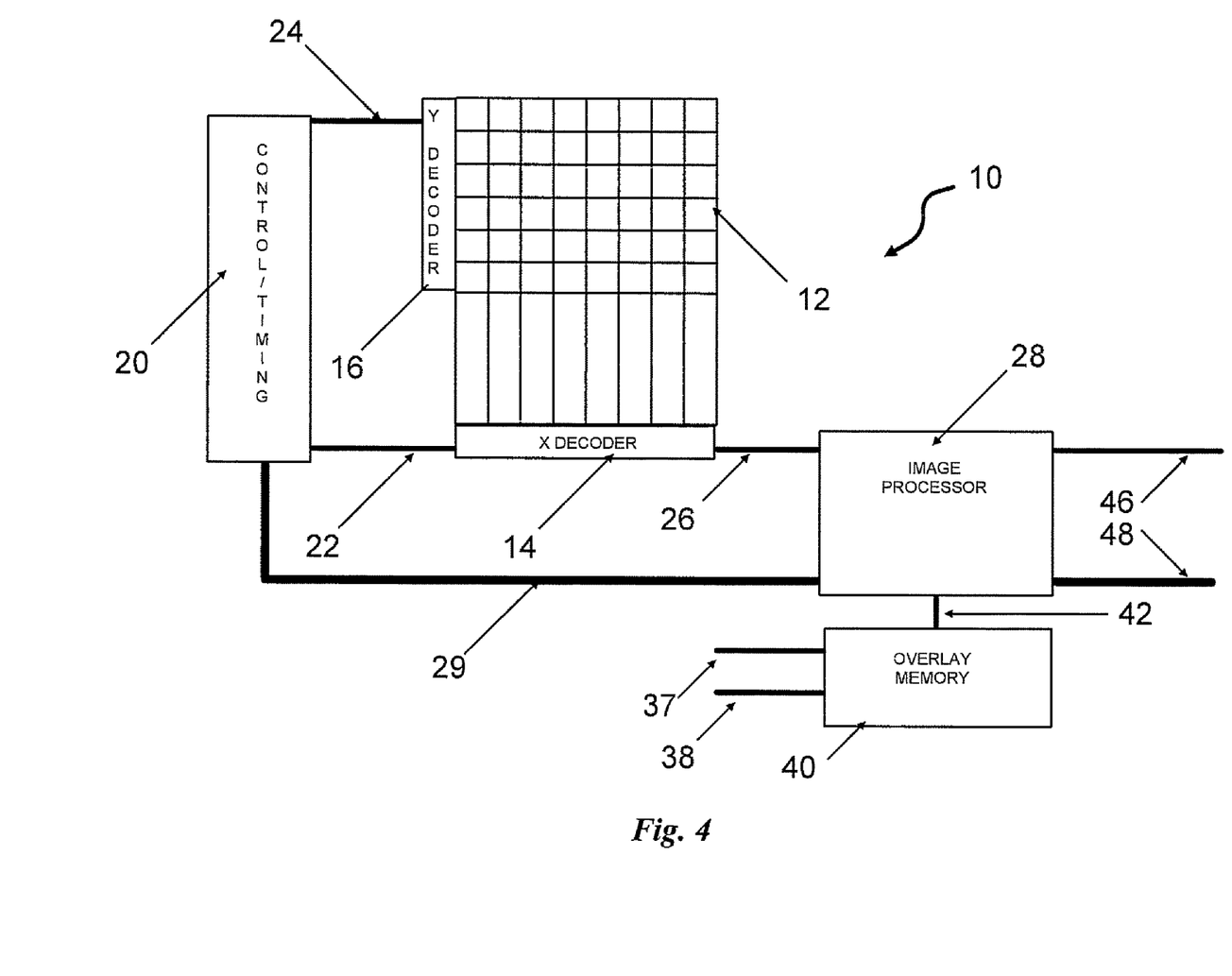
FIG. 4 is a schematic diagram illustrating an apparatus for adding caption and/or logo data to image data according to the invention.

An embodiment of a system according to the invention is shown in FIG. 4. The embodiment depicted in FIG. 4 is a combination of the devices shown in FIG. 3, namely the imager 10 and the overlay generator 34 (FIG. 3) in one device, without any (internal) control/timing generator 36 (FIG. 3) which was required for a standalone overlay generator 34. Since imager and caption generator are now embedded in the same apparatus, it is impossible to bypass the caption/logo overlay. Without interfering with the integrity of the apparatus, the added overlay may not be removed, which is especially beneficial if the added overlay is a sponsor's logo, for example.

With this embodiment the second digital image 2 is provided in the form of a second continuous sequential data stream, and the first and second digital images 1, 2 are combined by continuously combining the data in the first and second data streams. The second image 2 is stored in the overlay storage means/unit 40 in uncompressed format with the same dimensions as the first image 1.

Furthermore, the overlay, i.e. the caption, the logo etc., is beneficially stored in the overlay storage means/unit 40 in a compressed format and in a way which allows the overlay, i.e. the second image, to be converted into a second sequential data stream representing the same amount of data as the first sequential data stream originating from the first image, i.e. the image obtained from the pixel array 12. The conversion of the second image is beneficially facilitated by the second image being stored in a compressed format, e.g. RLL (Run-Length-Limited) format. The overlay storage means/unit 40 therefore does not require X and Y address information as input 37, 38 as shown in FIG. 4, but requires pixel clock and frame start information as input which is fed to the overlay storage means/unit 40 via pixel clock line 50 and frame start line 51 as shown in FIG. 5, which is a depiction of an alternative embodiment to the embodiment shown in FIG. 4.

Storing the compressed overlay in RLL format, as opposed to other known compression techniques such as a JPEG etc., is easier to implement, but it is also very suited for storing "artificial" images, such as logos, captions, etc (overlay). This is because such artificial images do not contain noise and as such, will have a large amount of similar data and hence, be easier to compress.

Figure 5:
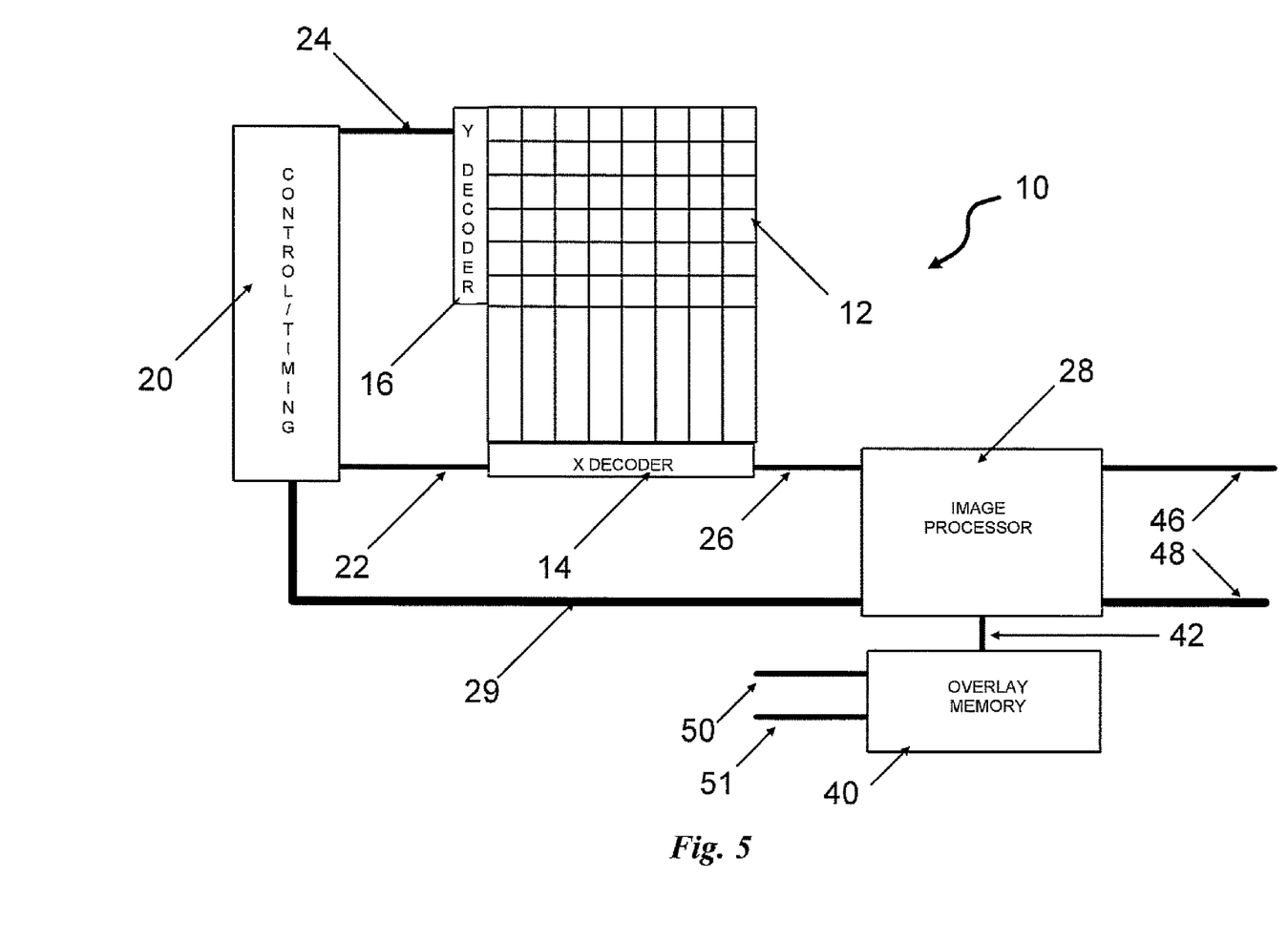
FIG. 5 is a schematic diagram illustrating an alternative embodiment of the apparatus of FIG. 4.
Figure 6:
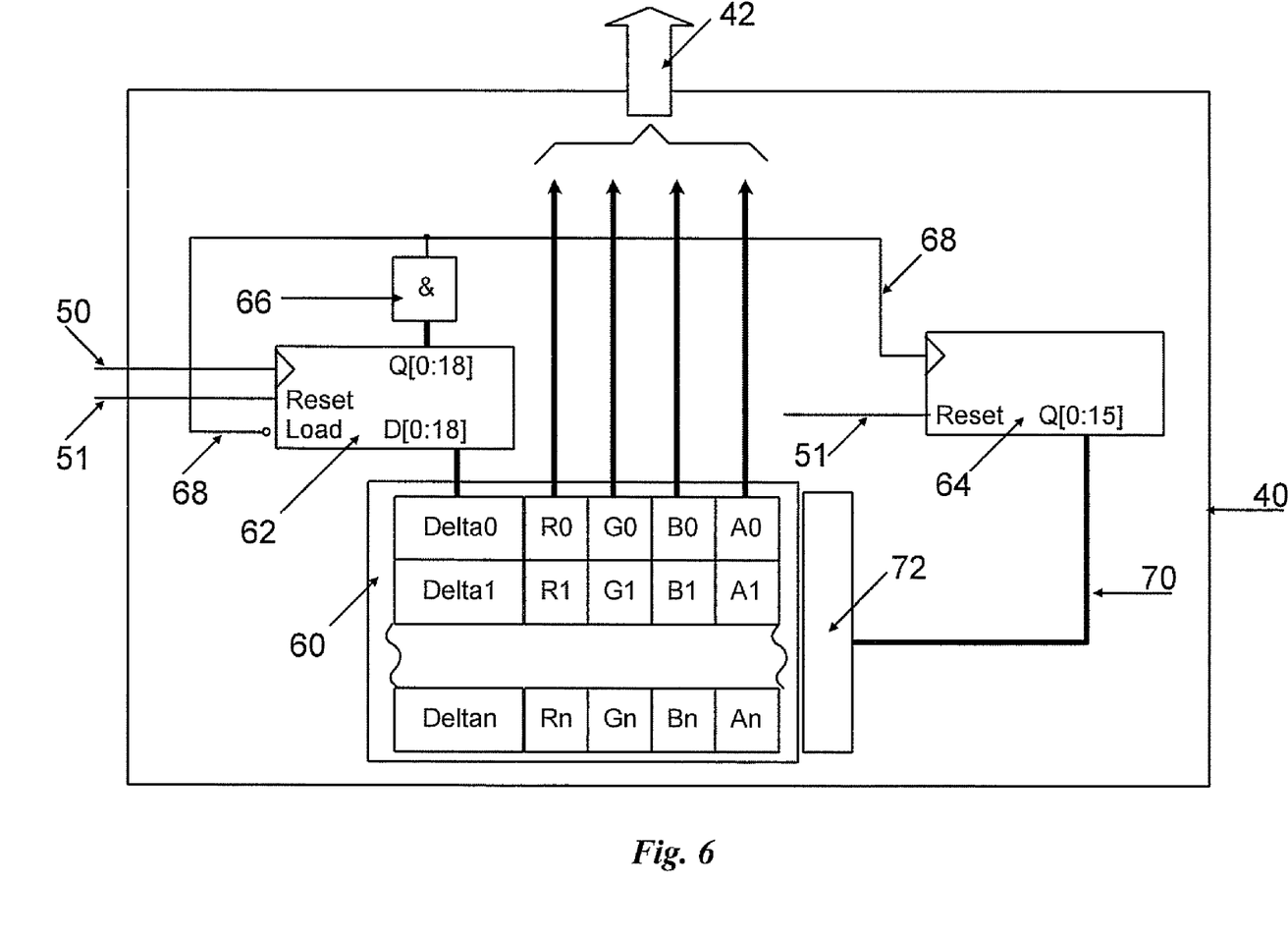
FIG. 6 is a schematic diagram illustrating an RLL encoder according to the invention.

The overlay storage means/unit 40 in the embodiment as shown in FIG. 5 therefore is a decoder, more particularly an RLL decoder, with integrated storage, more particularly an RLL image memory, wherein the overlay is stored. FIG. 6 shows how such an RLL decoder could be implemented. The embodiment in FIG. 6 is a simplified embodiment and it will be apparent for those skilled in the art that there are various ways of implementing an RLL decoder.

An RLL image store 60 stores the overlay, i.e. the second image, and would not need to be as big as a memory required for storing the whole first image, since the RLL coding of the second image and the nature of the image data of the second image, as detailed beforehand, accounts for massive compression ratios. The second image is stored in the RLL image store 60 in the form of a succession of datasets, each comprising an entry for the "Delta"-Value (Delta0, Delta1, . . . , Deltan), i.e. the number of successive occurrences of the same color value in the second image, the respective color value in the RGB coding scheme (R0, G0, B0; R1, G1, B1; . . . ; Rn, Gn, Bn), and optionally, a value indicating the combination mode (A0, A1, . . . , An).

Therefore, for practical applications, an RLL image memory 60 with a capacity of around a few kilowords would be sufficient. Depending on the quality of the overlay to be generated, i.e. black and white, limited pallet color or full color, and the number of combination modes ("on-the-fly modes") to be used, the word depth can vary, where black and white overlay data requires a word depth of one bit, grayscale overlay data requires a depth of 8 bits and limited or full color overlay data requires 16 bits or 24 bits, respectively. For three on-the-fly modes, two additional bits added to the above depth would be required.

Inputs to the overlay storage means/unit 40 are the pixel clock and the frame start signals provided via the pixel clock line 50 and the frame start line 51, respectively. These inputs are fed to an RLL counter 62. The pixel clock signal is fed to the RLL counter 62 at its clock input, and the frame start signal is fed to the RLL counter 62 at its reset input. The frame start signal is further fed to an image index counter 64 at its reset input. Upon receiving a frame start signal (a pulse on the frame start line 51) both the RLL counter 62 and the image index counter 64 are reset. A zero at the output of the RLL counter 62 causes a DiffPix signal to be generated via an AND-Gate 66, where the DiffPix signal is fed via a DiffPix line 68 to a load input of the RLL counter 62 and the clock input of the image index counter 64.

The pulse on the clock input of the image index counter 64 causes an increment of the image index which is fed via an image index bus 70 to an address decoder 72. The address decoder 72 selects from the RLL image store 60 the relevant dataset corresponding to the current image index, i.e. in the current case, for the initial value of the image index of "1", the dataset (Delta0, R0, G0, B0, A0). This causes the first values of the overlay to be generated (R0, G0, B0), which are fed via the overlay data line 42 to the image processor 28 (FIG. 5). The overlay data is maintained constant and always reflects the contents of the relevant data of the dataset selected according to the image index.

The pulse at the load input of the RLL counter 62, the DiffPix signal, causes the delta value of the dataset selected from the RLL image memory 60 according to the current image index to be loaded into the RLL counter 62. For each pixel clock cycle after the initial start frame pulse, the RLL counter 62 will decrement until it reaches zero. When the RLL counter 62 reaches zero, the DiffPix signal at the output of the AND-Gate 66 is zero causing the image index counter 64 to increment the image index, the RLL counter to load the next delta value and the new overlay data to be generated, and so on.

Figure 7:
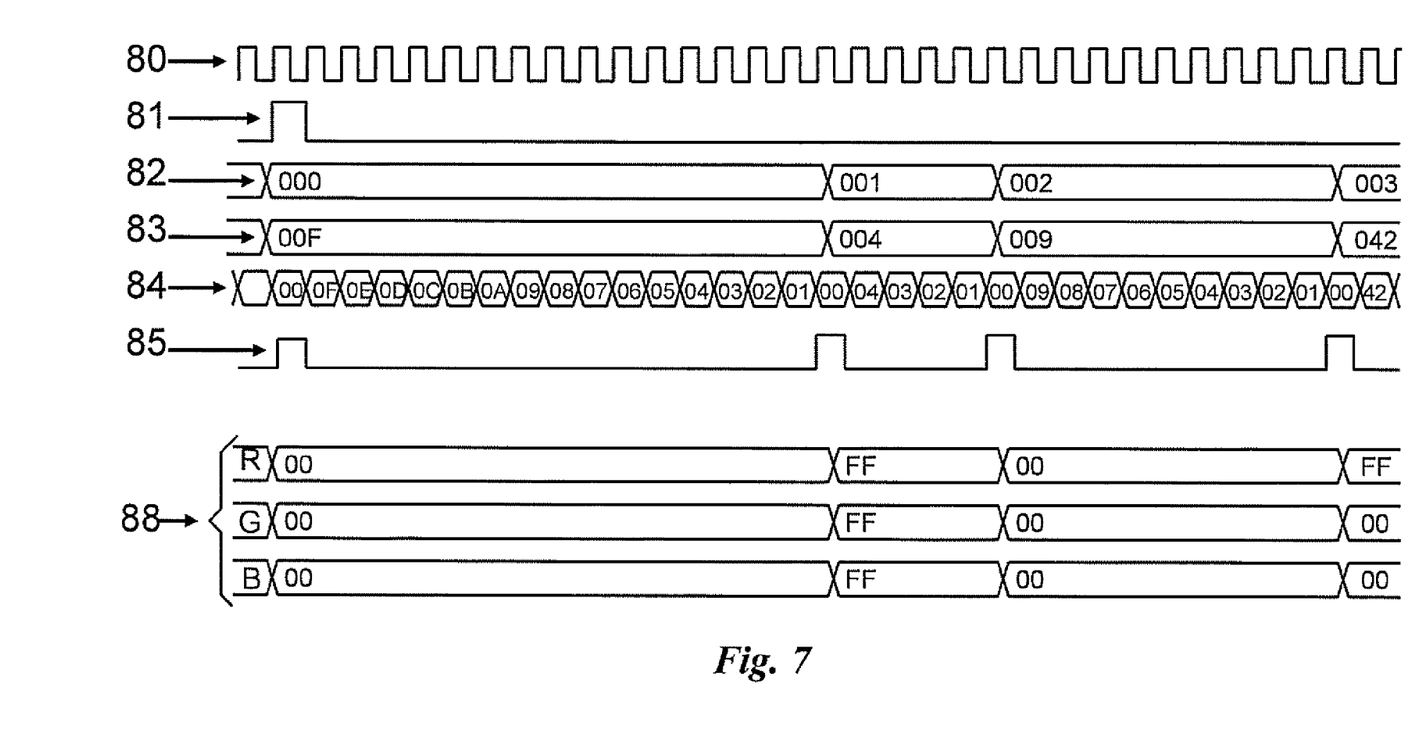
FIG. 7 is a timing diagram of the data processed when combining a first and a second digital image according to the invention.

FIG. 7 shows an example of the operation of the system using a timing diagram. From top to bottom the data shown is pixel clock data 80, fed to the overlay storage means/unit 40 via the pixel clock line 50, frame start data 81, fed to the overlay storage means/unit 40 via the frame start line 52, index bus data 82, delta bus data 83, RLL counter data 84 and trigger data (DiffPix Signal) 85. The resulting data of the overlay is provided at the overlay data line 42 in three channels according to the RGB color coding scheme. The three channels of the overlay data represent a continuous data stream, which, since it originated from the overlay data, i.e. the second image is referred to as the second sequential data stream 88. The second sequential data stream 88 is provided via the overlay data line 42 (FIG. 6) to the image processor 28.

In the example as shown in FIG. 7 the overlay to be generated is black (R:0, G:0, B:0) for sixteen pixels (HEX:00F), white (R:FF, G:FF, B:FF) for five pixels (HEX:004), black (R:00, B:00, B:00) for ten pixels (HEX:009) and red (R:FF, G:00, B:00) for sixty-seven pixels (HEX:042), where the remainder of the red frame of the overlay is not fully shown.

The start of the frame is defined by the control/timing generator 20 setting the frame start signal 81 to "high". This resets both the image index counter 64, i.e. the index bus data, and the RLL counter 62. A zero on the output of the RLL counter 62 causes the DiffPix signal to be asserted. This causes the first delta value ("Delta0=00F") to be loaded into the RLL counter 62. In the example shown, this is the hexadecimal value 00F.

Simultaneously, the first values of the overlay are generated (R:0, G:0, B:0="black"). For each pixel clock cycle after start frame, the RLL counter 62 will decrement until it reaches zero. In this example, sixteen cycles later. As long as the RLL counter 62 is decremented, the relevant RGB data will be maintained. As soon as the RLL counter 62 reaches zero, the image index counter 64 is incremented and the next delta value ("delta1=004") is loaded, and the next value of overlay data is output. In this case the output overlay data is R:FF, G:FF, B:FF (="white"). Since the relevant delta value for this portion of the overlay data is HEX:004 the output of the overlay data is maintained for five pixel clock cycles.

The RLL counter 62 is then decremented until it reaches zero again, causing the image index counter 64 to increment and the next delta value ("Delta2=009") to be loaded, and the next value of overlay data to be output (R:00, G:00, B:00="black"). The RLL counter 62 will count (decrement) for ten cycles, keeping the overlay data constant until the process is repeated with the next delta value and the corresponding overlay data. It can be seen from the example shown in FIG. 7 that data for thirty-one pixels has been generated with only three words of data required from the overlay image store 40. This shows a compression rate of over 10:1.

Figure 8:
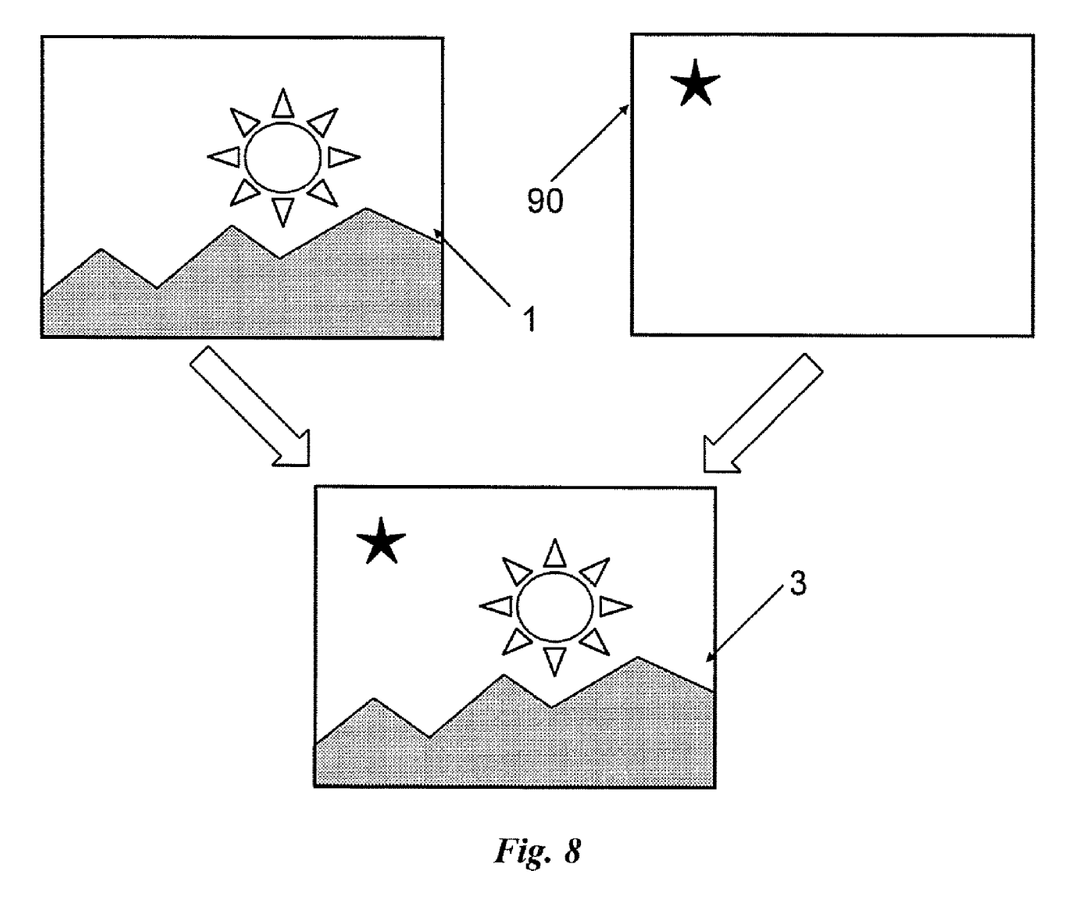
FIG. 8 is a simplified diagram illustrating the combination of a first and second digital image according to the invention.

Thus the RLL coding allows for the overlay data to be stored in the RLL image store 60 and to be converted (decoded) into a second image 90 (and into a second sequential data stream 88) representing or comprising the same amount of data as the first digital image 1 (and the first sequential data stream associated with the first digital image 1) as shown in FIG. 8. It is to be understood that the second image 90 is normally static, i.e. the same overlay image for all frames, i.e. all "first images" 1, but can be "quasi-static" also, i.e. can provide simple animation, such as blinking, scrolling text etc. An animation such as blinking can easily be achieved by using the "A" channel explained below. More complex animations such as scrolling text can easily be implemented by using a plurality of second images 90 (not depicted) and by selecting the relevant second image 90 according to a given timing.

Figure 9:
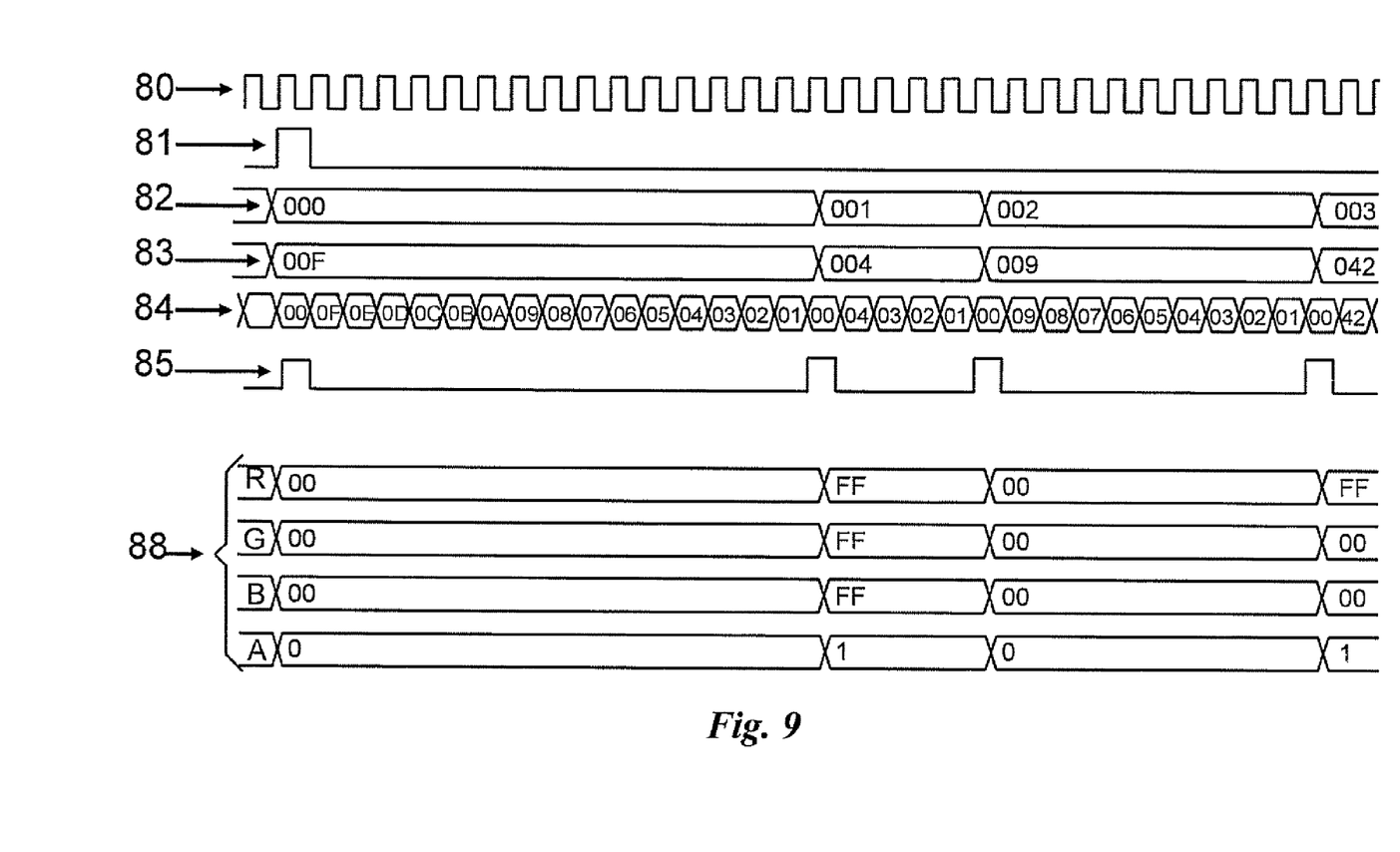
FIG. 9 is another timing diagram of the data processed when combining a first and a second digital image according to the invention.

FIG. 9 is a timing diagram which is substantially identical to the timing diagram shown in FIG. 7. However, the overlay data, the second sequential data stream 88, includes an additional channel ("A" channel) indicating the relevant combination mode. During the RLL decoding the data provided in the additional channel is kept constant during the relevant delta cycle as applies for the respective RGB values. Each numerical value provided on the additional channel represents a distinctive combination mode, where a "zero" for example, could indicate that the original image (first image) received from the pixel array 12 will be unchanged, or where a value of "one" for example, indicates that the overlay data, i.e. the data of the second sequential data stream, superimposes the data of the first image, i.e. the data comprised in the first sequential data stream, and where a value of "two" may indicate that the respective values comprised in the first and the second sequential data stream will be added (and truncated to a maximum image data value), etc.

If the overlay storage means/unit 40 is implemented in non volatile memory (e.g. ROM) then the overlay cannot be altered or changed by the user. This type of feature is ideal for applications where video devices, such as webcams, are given away for free as part of an advertising or marketing campaign. With this, as well as putting a sponsor's logo on the camera's case, it is often desirable to insert the sponsor's logo as overlay onto the video stream. By using the invention this can be done in a manner which does not require any intervention by the user, nor can be disabled.

However, if the overlay storage means/unit 40 is implemented in RAM and if there is a mechanism implemented to change the data (for example via a typical interface mechanism such as USB) then the caption data can be changed as required by the user. This type of feature is ideal for applications where it is desirable to add features to video devices such as webcams. One such feature would be to enable the user to add overlay in the form of captions/background/logo to the image. As the RLL image storage mechanism is so efficient it would be possible to implement two overlay storage means/units 40, one in ROM where the sponsor's logo would be stored, in addition to one overlay stored in RAM where the user could add their own customization.

It will be understood that the method described beforehand can be implemented in software and or as a combination of hardware and/or software implementation. For example the blocks/means depicted in FIG. 6 and most of the means depicted in FIG. 2, apart from the imager 10, could be implemented in software. Thus, the invention also relates to a computer readable program code implementing the method steps described beforehand to be performed by a digital computer when the program code is run on such a digital computer. Furthermore, the invention relates to a computer program product, such as storage means, e.g. a computer readable diskette, containing the above computer readable program.

That which is claimed is:

1. A method of processing a first digital image by combining the first digital image with a second digital image, the method comprising:
    receiving the first digital image from a pixel array and converting the first digital image into a first continuous sequential data stream;
    providing the second digital image as a second continuous sequential data stream;
    the second continuous sequential data stream comprising second image data and combination mode data associated therewith, the combination mode data representing one of a plurality of combination modes; and
    selectively combining the first and second digital images by selectively combining data in the first and second continuous sequential data streams based upon the one of the plurality of combination modes and irrespective of user input;

the plurality of combination modes comprising an arithmetical combination mode and a logical combination mode.

2. The method of claim 1, wherein providing the second digital image comprises converting the second digital image into the second continuous sequential data stream representing a same amount of data as the first continuous sequential data stream of the first digital image.

3. The method of claim 2, wherein converting the second digital image comprises:
storing the second digital image in a compressed format; and
converting the second digital image into the second continuous sequential data stream.

4. The method of claim 2, wherein converting the second digital image comprises:
storing the second digital image in a Run Length Limited (RLL) format; and
converting the second digital image into the second continuous sequential data stream.

5. An apparatus for processing a first digital image by combining the first digital image with a second digital image, the apparatus comprising:
a pixel array;
an image processor receiving the first digital image from the pixel array, converting the first digital image into a first continuous sequential data stream; and
a memory storing the second digital image as a second continuous sequential data stream;
the second continuous sequential data stream comprising second image data and combination mode data associated therewith, the combination mode data representing one of a plurality of combination modes;
the image processor selectively combining the first and second digital images by selectively combining data in the first and second continuous sequential data streams based upon the one of the plurality of combination modes and irrespective of user input;
the plurality of combination modes comprising an arithmetical combination mode and a logical combination mode.

6. The apparatus of claim 5, wherein the memory stores the second digital image as the second continuous sequential data stream representing a same amount of data as the first continuous sequential data stream of the first digital image.

7. The apparatus of claim 6, wherein the memory stores the second digital image in a compressed format.

8. The apparatus of claim 6, wherein the memory stores the second digital image in a Run Length Limited (RLL) format.

9. A non-transitory computer-readable medium having computer-executable instructions for processing a first digital image, received from a pixel array, by combining the first digital image with a second digital image, the computer-executable instructions performing the following steps:
converting the first digital image into a first continuous sequential data stream;
providing the second digital image as a second continuous sequential data stream;
the second continuous sequential data stream comprising second image data and combination mode data associated therewith, the combination mode data representing one of a plurality of combination modes;
selectively combining the first and second digital images by selectively combining data in the first and second continuous sequential data streams based upon the one of the plurality of combination modes and irrespective of user input;

the plurality of combination modes comprising an arithmetical combination mode and a logical combination mode.

10. The non-transitory computer-readable medium of claim 9, wherein providing the second digital image comprises converting the second digital image into the second continuous sequential data stream representing a same amount of data as the first continuous sequential data stream of the first digital image.

11. The non-transitory computer-readable medium of claim 10, wherein converting the second digital image comprises:
storing the second digital image in a compressed format; and
converting the second digital image into the second continuous sequential data stream.

12. The non-transitory computer-readable medium of claim 10, wherein converting the second digital image comprises:
storing the second digital image in a Run Length Limited (RLL) format; and
converting the second digital image into the second continuous sequential data stream.

13. A method of processing a first digital image by combining the first digital image with a second digital image, the method comprising:
receiving the first digital image from a pixel array and converting the first digital image into a first continuous sequential data stream;
providing the second digital image as a second continuous sequential data stream;
the second continuous sequential data stream comprising second image data and combination mode data associated therewith, the combination mode data representing one of a plurality of combination modes; and
selectively combining the first and second digital images by selectively combining data in the first and second continuous sequential data streams based upon the one of the plurality of combination modes;
the plurality of combination modes comprising a static combination mode and a semi-static combination mode;
the semi-static combination mode comprising
a first mode wherein the first image is unchanged,
a second mode wherein the second image is superimposed on the first image, and
a third mode wherein the second and first images are added and their sum is truncated.

14. The method of claim 13, wherein providing the second digital image comprises converting the second digital image into the second continuous sequential data stream representing a same amount of data as the first continuous sequential data stream of the first digital image.

15. The method of claim 14, wherein converting the second digital image comprises:
storing the second digital image in a compressed format; and
converting the second digital image into the second continuous sequential data stream.

16. The method of claim 14, wherein converting the second digital image comprises:
storing the second digital image in a Run Length Limited (RLL) format; and
converting the second digital image into the second continuous sequential data stream.

* * * * *